Sept. 14, 1954     W. C. BUSHEY ET AL     2,688,990
BAND SAW GUIDE
Filed July 31, 1951
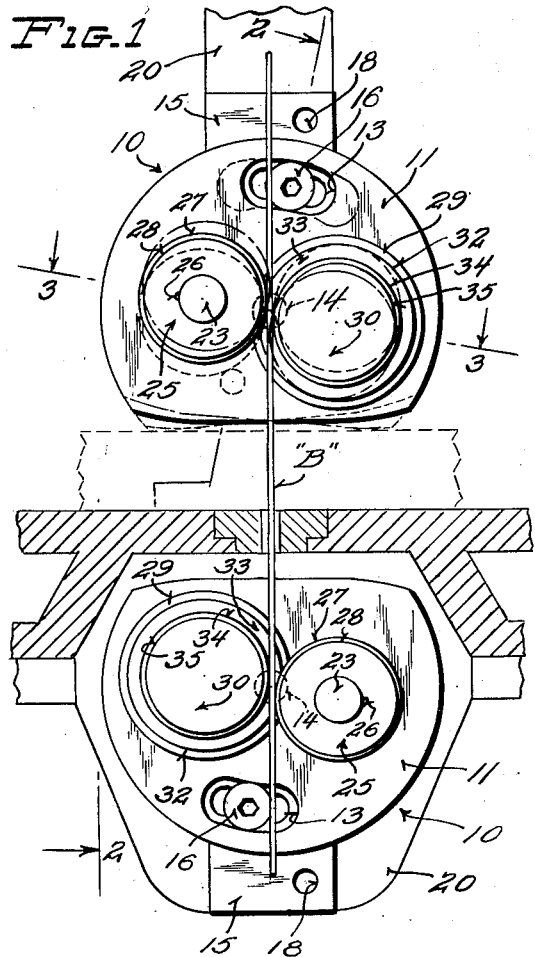
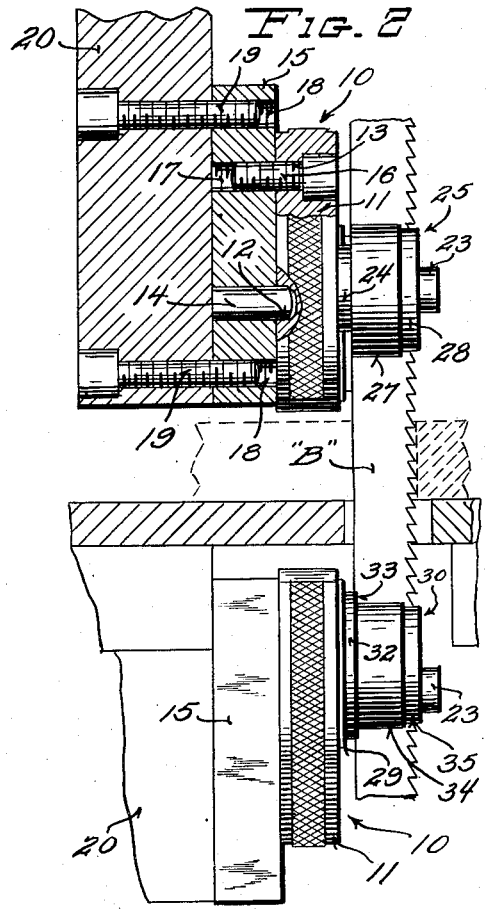
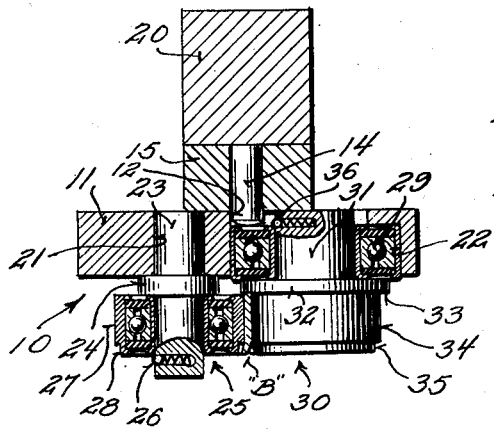
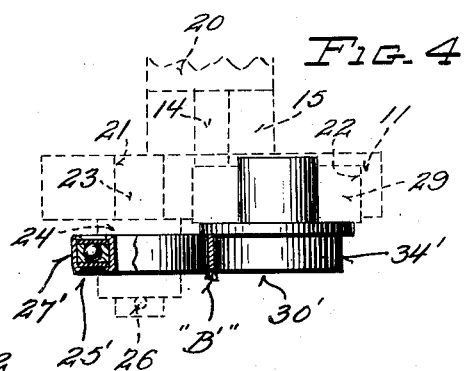
INVENTORS.
WALTER C. BUSHEY
CARL T. McLUEN
By *Erwin B. Eiring*
ATTORNEY Patented Sept. 14, 1954

2,688,990

UNITED STATES PATENT OFFICE 2,688,990

BAND SAW GUIDE

Walter C. Bushey and Carl T. McLuen,
Milwaukee, Wis.

Application July 31, 1951, Serial No. 239,529

3 Claims. (Cl. 143—161)

1

This invention relates to band saw guides, and more particularly to the type of saw guide wherein a pair of cooperating rollers mounted in fixed spaced relationship on a rotatably adjustable member serve to contact the side and rear edges of the saw blades of different widths and thicknesses to serve as a guide for the same.

While numerous band saw guides embodying rollers for contacting the saw blade are now in common use, the usual arrangement of these devices includes the incorporation of rollers adjustable with respect to each other to alter the spaced relationship of the rollers to compensate for saw blades of different thicknesses and in many instances these devices provide a separate backing roller for contact with the rear edge of the blade to accomodate for the thrust placed on the saw blade as the workpiece is being cut. Saw guides of the type just referred to have several structural and functional objections; among which are the structural complexities of the device which adds greatly to its cost; the relatively small space into which the device must be fitted and the difficulties encountered in making the necessary adjustments of the several cooperating parts of the device to accommodate for changes in the thicknesses or widths of blades dictated by variations in the material of successive jobs at hand.

The primary object of the present invention resides in the provision of a new and improved saw guide having a pair of saw blade contacting rollers arranged in fixed spaced relationship upon a rotatably adjustable member arranged for angular adjustment to alter the saw blade receiving space between the adjacent cooperating peripheral surfaces of the saw contacting rollers to provide an effective guide for saw blades of different thicknesses.

Another object of the invention resides in the provision in a saw guide of a pair of laterally spaced cooperating rollers, one of which is provided with a backing flange adapted to contact the rear edge of the saw blade to support the same against the pressure exerted by a workpiece during a cutting operation.

Another object of the present invention resides in the provision in a new and improved saw guide of simple and effective means for removably attaching a pair of coperating rollers on a rotatably adjustable member to accomodate saw blades of different thicknesses and depths in accordance with the requirements of the work at hand.

A further object of the present invention resides in the provision of a pair of saw guides adapted for positioning respectively above and below the work receiving surface of the band saw and in relatively close proximity to the work to provide adjustable means for guiding the saw blade and supporting the same against the pressure of a workpiece during a cut.

Other objects will become apparent from the following description of an illustrative embodiment of the invention shown in the accompanying drawing.

In the drawing:

Figure 1 is a fragmentary view of part of a band saw provided with a saw guide constructed in accordance with the teachings of the present invention;

Fig. 2 is a vertical sectional view taken substantially along the line 2—2 of Fig. 1, and showing a means by which the saw guide may be attached to a part of the machine and further showing the means for releasably retaining the rotatably adjustable roller carrying member in desired position of angular adjustment on its supporting member;

Fig. 3 is a horizontal sectional view taken on the line 3—3 of Fig. 1 showing the cooperating saw contacting rollers releasably retained in operating position on the rotatably adjustable member of the saw guide; and Fig. 4 is a view similar to that shown in Fig. 3 illustrating an alternate set of rollers suitable for guiding a saw blade having dimensions other than those shown in Fig. 3; the support for this alternate set of rollers being identical with that shown in Fig. 3 and herein illustrated in dotted lines.

Referring more particularly to Fig. 1, it will be noted that a pair of saw guides 10, chosen for illustrative purposes in the accompanying drawing are identical in form and are mounted in vertically aligned position, the upper one being attached to a movable part of the band saw disposed above the work supporting table of the machine and the lower one being inverted and secured below the table of the machine.

Each saw guide 10 includes a member 11 having a centrally disposed bore 12 and a shouldered arcuate slot 13. The member 11 is for rotatable adjustment on a pin 14 projecting from a mounting plate 15, the projecting portion of the pin 14 being disposed in the central bore 12 of the member 11. A cap screw 16, positioned in the arcuate slot 13 of the member 11, is threadedly receivable in a bore 17 formed in the mounting plate 15 to releasably retain the member 11 in desired position of angular adjustment on the plate 15 for a purpose to be hereinafter more specifically described. The mounting plate 15 is further provided with a pair of spaced bores 18 which are threaded to receive cap screws 19 which pass through a portion 20 of the machine to releasably retain the saw guides 10 in proper position on the machine frame.

The member 11 which is adapted for rotatably adjustable positioning on the mounting plate 15 includes a bore 21 disposed to one side of the bore 12 and a larger bore 22 having its center disposed at the opposite side of the bore 12. The bore 21 is adapted to receive one end of a stub shaft 23 which is pressed into the bore 21. A shoulder 24, formed intermediate the ends of the shaft 23 abuts the surface of the member 11 and also provides an abutment for a roller 25 adapted to be removably mounted on the outer portion of the stub shaft 23. A ball and spring detent mechanism 26 positioned in a radially disposed bore positioned adjacent to the outer extremity of the stub shaft 23 provides a yieldable means for releasably retaining the roller 25 in desired position when it is applied to the stub shaft 23. It should be noted at this time that the roller 25 comprises a deep grooved, double sealed roller bearing, the inner race of which is slidably receivable on the stub shaft 23 and the outer race of which includes a peripheral surface 27 adapted to contact one side of a saw blade B. The outer portion of the surface 27 is ground to a smaller diameter 28 to afford a free space within which the offset teeth of the blade B are accommodated.

The larger bore 22 in the member 11 is adapted to receive a deep grooved, double sealed antifriction thrust bearing 29, the outer race of which is pressed into the bore 22 to provide a permanent mounting for bearing 29 which in turn provides the mounting means for a roller 30. The roller 30 includes a stub shaft portion 31, receivable in the center opening of the bearing 29, a flange portion 32 having a rear surface adapted to abut the forward face of the bearing 29 and a forward surface adapted to lie behind the inner surface of the roller 25 and form a contact surface 33 against which the rear edge of the band saw B runs under the pressure of a workpiece during a cutting operation. The roller 30 is further provided with a peripheral surface 34 which cooperates with the peripheral surface 27 of the roller 25 to delineate a band saw blade receiving passage. The outer end of the surface 34 has a reduced diameter 35 to provide a space within which the offset teeth of the band saw blade are accommodated. The stub shaft portion 31 of the roller 30 is provided with a ball and spring detent mechanism 36 similar to that provided in the stub shaft 23 for releasably retaining the roller 30 in properly adjusted position within the thrust bearing 29.

A brief description of the positioning, adjustment and operation of the saw guide 10 will serve to emphasize its numerous advantages. After the mounting plates 15 of the saw guides 10 have been properly positioned upon the parts of the band saw by the application and tightening of the cap screws 19, the cap screw 16 in the upper member 11 may be rotated into an annular position in which the surface 27 of the roller 25 and the surface 34 of the roller 30 contact the opposite sides of the saw blade B exerting thereon merely enough pressure to provide a positive free rolling contact therewith in close proximity to the top surface of the workpiece. When the member 11 of the upper saw guide 10 has thus been properly positioned, the cap screw 16 is tigtened to releasably retain the rotatably mounted member 11 in proper position. The member 11 of the lower saw guide 10 may then be adjusted in the same manner and the cap screw 16 tightened when the adjustment is completed. With both upper and lower saw guides 10 properly positioned, it will be noted that the saw blade B is firmly guided in close proximity with the top and bottom surface of a workpiece to insure ample stability for the fast moving blade when it is in operation. It will further be noted that the forward surface of the flange 32 of the roller 30 of both top and bottom saw guides 10 provides suitable pressure transmitting surface for the thrust placed upon the saw blade under the action of a workpiece being cut. The thrust thus imparted to the rollers 30 through the saw blade B is ably handled by the thrust bearing 29 which supports the roller 30. Referring more particularly to the upper saw guide 10 shown in Fig. 1, it will be noted that the properly adjusted position of the member 11 is shown in full lines. If the cap screw 16 is loosened and the member 11 is rotated in a counter-clockwise direction to the extreme position, as indicated by the dotted line showing, it will be noted that the saw blade receiving passage has been widened considerably, between the cooperating peripheral portions of the rollers 25 and 30, to accommodate a thicker saw blade. Similarly, if the cap screw 16 is loosened and the member 11 is rotated in a clockwise direction to the extreme position, shown in dot-dash lines, it will be noted that the saw receiving passage between the cooperating peripheral portions of the rollers 25 and 30 has been narrowed considerably to accommodate a thinner saw blade. Thus it will readily be understood that the proper angular positioning of the members 11 will serve to apply suitable guiding contact for saw blades of different thicknesses without requiring the individual adjustment of the cooperating rollers.

Referring more particularly to Fig. 4 of the accompanying drawing, it will be noted that an alternate pair of rollers 25' and 30' have been shown. The rollers are provided with peripheral surfaces 27' and 34' which are somewhat narrower than those illustrated in the rollers shown in remaining figures of the drawing. This particular set of rollers is adapted to accommodate a saw blade B' which is narrower than the saw blade B and it should also be noted at this time that the offset teeth of the saw blade B' project beyond the forward edges of the rollers 25' and 30'. The rollers 25' and 30' are applied respectively to the stub shaft 23 and the thrust bearing 29 in the identical manner described in conjunction with the rollers 25 and 30. It should be understood that these rollers 25' and 30' comprise one pair of any number of sets of pairs of similar rollers, each adapted for a saw blade having different widths so that any selected pair of rollers may selectively be applied to the saw guides 10 to accommodate any selected saw blade adapted for the particular work at hand.

The rotatably adjustable member 11 serves in every instance to permit the saw blade contacting peripheral surfaces of the cooperating rollers to contact the respective sides of the saw blade regardless of the thickness of the particular blade.

From the foregoing description it will be noted that a simple and effective saw guide has been produced incorporating a pair of saw contacting rollers, disposed in fixed spaced relationship on a member which is mounted for rotatable adjustment to alter the saw receiving space between the rollers in accordance with the thickness of the particular saw blade which they are guiding.

While the invention has been described in considerable detail, in the foregoing specification, it is to be understood that various changes may be made in its embodiment without departing from or sacrificing any of the advantages hereinafter claimed.

We claim:

1. A band saw guide for attachment to a band saw machine including a work supporting table, an endless band saw and a guide supporting member, said band saw guide comprising a mounting plate having a flat front vertical face, anchoring means for releasably retaining said mounting plate in fixed position on said guide supporting member, a roller supporting element mounted for rotatably adjustable positioning about a horizontal axis on the front face of said mounting plate, said roller supporting element including flat parallel front and rear faces, a pair of rollers mounted in fixed laterally spaced relationship on and extending forwardly from the front face of said roller supporting element, said rollers having adjacent peripheral surfaces cooperating to delineate a band saw blade receiving passage therebetween, and anchoring means for releasably retaining the flat rear face of said roller supporting element in selected position of rotation on the flat front face of said mounting plate wherein the cooperating peripheral surfaces of said rollers lie in rolling pressure contact with the opposite sides of said band saw blade to thereby provide a guide for the same.

2. A band saw guide as set forth in claim 1, in which each of said rollers is releasably retained in said roller supporting element.

3. A band saw guide as set forth in claim 1, in which one of said rollers includes a flange portion cooperating with said other roller to form a closure for the base of said band saw receiving passage to provide a thrust receiving guide surface for the smooth rearward edge of the band saw blade.

References Cited in the file of this patent

UNITED STATES PATENTS

| Number | Name | Date |
|---|---|---|
| 598,476 | Dyer et al. | Feb. 1, 1898 |
| 1,360,564 | Newell | Nov. 30, 1920 |
| 1,478,774 | Stowell et al. | Dec. 25, 1923 |
| 1,528,592 | Wilderson | Mar. 3, 1925 |
| 1,870,402 | Carter | Aug. 9, 1932 |

FOREIGN PATENTS

| Number | Country | Date |
|---|---|---|
| 901,459 | France | Nov. 6, 1944 |